United States Patent
Meyers

(10) Patent No.: US 8,079,599 B2
(45) Date of Patent: Dec. 20, 2011

(54) COMPRESSIBLE TANK SEAL

(75) Inventor: Theodore W. Meyers, Barrington, IL (US)

(73) Assignee: Tug-Tite, Inc., Lake Zurich, IL (US)

( * ) Notice: Subject to any disclaimer, the term of this patent is extended or adjusted under 35 U.S.C. 154(b) by 552 days.

(21) Appl. No.: 12/334,011

(22) Filed: Dec. 12, 2008

(65) Prior Publication Data

US 2009/0152820 A1  Jun. 18, 2009

Related U.S. Application Data

(60) Provisional application No. 61/013,879, filed on Dec. 14, 2007.

(51) Int. Cl.
  *E04G 15/00* (2006.01)
  *F16L 5/02* (2006.01)
(52) U.S. Cl. ........ 277/606; 277/604; 277/607; 277/617; 249/39; 264/319
(58) Field of Classification Search ............. 277/604, 277/606, 607, 617; 249/39; 264/319
  See application file for complete search history.

(56) References Cited

U.S. PATENT DOCUMENTS

| | | | |
|---|---|---|---|
| 3,363,912 A | | 1/1968 | Holloway |
| 4,029,894 A | * | 6/1977 | Jarvis et al. ............... 174/70 S |
| 4,200,299 A | * | 4/1980 | Carlesimo ............... 277/606 |
| 4,342,462 A | | 8/1982 | Carlesimo |
| 4,387,900 A | | 6/1983 | Ditcher et al. |
| 4,732,397 A | | 3/1988 | Gavin |
| 4,805,920 A | | 2/1989 | Gavin |
| 4,809,994 A | | 3/1989 | Skinner et al. |
| 4,951,914 A | | 8/1990 | Meyers et al. |
| 5,286,040 A | | 2/1994 | Gavin |
| 5,529,312 A | | 6/1996 | Skinner et al. |
| 5,601,291 A | | 2/1997 | Gavin |
| 5,626,346 A | | 5/1997 | Gavin |
| 5,711,536 A | * | 1/1998 | Meyers ............... 277/606 |
| 5,741,015 A | | 4/1998 | Skinner |
| 5,876,039 A | | 3/1999 | Skinner et al. |
| 5,941,535 A | * | 8/1999 | Richard ............... 277/606 |
| 6,406,025 B1 | * | 6/2002 | Westhoff et al. ............... 277/314 |
| 6,450,505 B1 | | 9/2002 | Gavin |

(Continued)

OTHER PUBLICATIONS

"CAST-A-SEAL® 402" Product Information Sheets, published more than one year before Dec. 14, 2007. (www.press-seal.com).

*Primary Examiner* — Alison Pickard
(74) *Attorney, Agent, or Firm* — Marshall, Gerstein & Borun LLP

(57) ABSTRACT

A tank seal for use in cast concrete walls has a generally cylindrical main body portion with a stepped outside wall having first axially-extending portion, a second axially-extending portion having an outermost diameter less than an outermost diameter of the first axially-extending portion, and a radial ledge or step separating the first and second axially-extending portions. A wiper blade portion extends radially inwardly of the stepped outside wall, from an end of the second axially-extending portion opposite the radial ledge, terminating at a third end. A circular membrane or web extends across the third end, including at least one annular groove therein to facilitate removal of at least one circular portion of the web. The radial ledge collapses and the first axially-extending portion puckers in response to compressive force exerted on the tank seal in an axial direction, reducing the axial length of the tank seal.

14 Claims, 8 Drawing Sheets

U.S. PATENT DOCUMENTS

| | | |
|---|---|---|
| 6,460,860 B2 | 10/2002 | Gavin |
| 6,568,691 B1 | 5/2003 | Westhoff et al. |
| 6,691,975 B1 | 2/2004 | Gavin |
| 7,028,972 B2 | 4/2006 | Miller et al. |
| 7,086,652 B1 | 8/2006 | Gavin |
| 2006/0163821 A1* | 7/2006 | Henry .......................... 277/604 |

* cited by examiner

COMPRESSIBLE TANK SEAL

REFERENCE TO RELATED APPLICATIONS

This application claims the benefit of the filing date of U.S. Provisional Application No. 61/013,879, filed Dec. 14, 2007.

FIELD OF THE DISCLOSURE

This disclosure relates generally to tank seals for use with accessories for cast concrete components of underground waste treatment and drainage systems and, more particularly, to tank seals having compressibility relative to walls of a form, so as to readily adapt to the limited distance between a door and a wall of a core of a given casting form.

DESCRIPTION OF THE EXISTING ART

Tank seals have been cast into distribution boxes, septic tanks, and other concrete underground on-site waste collection, treatment, and drainage systems for many years. An existing problem of such tank seals has been that the stiffiess of the seals deprives the seals of the ability to predictably deform in order to accommodate the distance between a door and a core of a concrete form. Such distances regularly vary from form to form. Because conventional tank seals are incompressible and generally lack pliability, when placed on a cast-door mounted mandrel and then closed between the door and the core, in some instances the seal will not compress at all, making it difficult or impossible to close the door to the form.

There are significant drawbacks to unpredictable buckling of the tank seals. For instance, when concrete is poured into the form, the concrete can seep into the deep area between the sealing area of the seal and the exterior sealing wall of the seal. Once the concrete enters that region of the seal and hardens, the seal cannot expand at all. The seal will lack the flexibility to accommodate a pipe. To compensate, those casting the seals in the form have to spend an inordinate amount of time after casting in chipping unwanted concrete out of regions of the seal where it would prevent the seal from flexing.

Another issue with conventional seals is the manner in which portions of the web of the seal are removed to accommodate a pipe. Annular score lines or annular grooves of reduced wall thickness are typically provided in the web across the closed end of the seal, which the installer uses as a guide to tear out or cut out the selected portion of web material to produce an opening in the seal of a desired diameter. However, upon removal of the selected web portion, such annular score lines or annular grooves do not always result in a tight tolerance for the resulting opening. While tear-out initiation keys or tongues may be provided on one or more of the selectable knock-out portions, installers frequently use box cutters, jack-knives, screwdrivers, or other tools to initiate or propagate a tear in the annular score line or annular groove to remove the desired portion of the web. These tools, as well as an uneven tearing motion, can introduce subtle but unwanted irregularities in the roundness of the seal opening. It would be desirable if the portion of web or membrane remaining on the tank seal after removal of a given section thereof to accommodate a pipe in the tank seal had features that facilitate enhanced sealing engagement with the pipe.

The manner in which these and other shortcomings of conventional tank seals are overcome is described in the following sections of this disclosure.

SUMMARY OF THE DISCLOSURE

The generally cylindrical main body tank seal of the present disclosure is preferably made of injection molded plastic and includes a stepped outer wall, including a first axially-extending portion extending from a first open or free end to an outer rim of a radial ledge or step, and a second axially-extending portion extending from an inner rim of the radial step to a second end of the cylindrical main body. Preferably, the entire tank seal is formed of linear low density polyethylene. Radially inward of the stepped outer wall, a wiper blade portion extends from the second end of the generally cylindrical main body in the direction toward the first open end, terminating at a third end. A circular sealing membrane or web extends across the third end.

One or more annular flanges or ribs can project radially outward from the generally cylindrical main body of the tank seal. One of the annular ribs may be provided on the second axially-extending portion of the cylindrical main body, and is preferably axially spaced from the radial step. In a preferred embodiment, the annular rib on the secorid axially extending portion of the cylindrical body closest to the radial ledge is spaced at least about 0.15" from the radial ledge, and the radial ledge has a length of at least about 0.25".

The radial step is un-reinforced, such that when compressive forces are exerted on the first or free end and the second end of the generally cylindrical main body (such as when the tank seal is urged against a core of a form and the door of the form is closed), the radial step, which is flexible, collapses in a predictable and reliable manner. This resulting substantially uniform, telescopic collapse of the tank seal is referred to herein as a "first stage" of the axial compression of the tank seal. In a preferred embodiment, the telescopic collapse of the tank seal continues until the annular rib on the second axially extending portion of the cylindrical body closest to the radial ledge makes contact with an outer portion of the radial ledge.

A "second stage" of the axial compression of the tank seal of the present disclosure includes the first axially-extending portion of the cylindrical main body puckering, i.e. bulging outward, in a predictable manner, as a result of the compressive forces exerted on the free end and the second end of the cylindrical main body.

The resulting axial compression of the tank seal need not be completely uniform from top to bottom of the seal. This enables the tank seal to maintain axial overall alignment even in response to unevenly-distributed axial compressive forces. For instance, the side walls of the core of concrete forms are tapered from top to bottom to facilitate removal of a resulting concrete component (which is cast upside down) from the form. The distance between the door of the form and the core is less at an lower end of the tank seal (during casting) than at an upper end of the tank seal. When the door to the form is closed, the compressive forces are therefore greater at the lower end of the tank seal than at the upper end.

One conventional approach to compensate for the taper of the side walls of the core of the form is to bevel the mandrel on which the seal is mounted at a corresponding angle, so that the diameter of the portion of the seal closest to the core is parallel to the sidewall of the core. However, this beveling of the mandrel undesirably adds a labor-intensive step. In addition, when positioning the beveled mandrel on the door of the form, one must exercise care to secure the mandrel to the door in the proper orientation. If the mandrel is secured to the door with the angle of the mandrel out of position, the bevel of the mandrel compounds, rather than compensates for, the problem presented by the taper of the side wall of the core.

The "first stage" and the "second stage" of the axial compression of the tank seal need not be mutually exclusive. Thus, the first axially-extending portion of the cylindrical main body may pucker, at least to some degree, during the first stage. Even so, once the annular rib on the second axially extending portion of the cylindrical body closest to the radial ledge makes contact with an outer portion of the radial ledge (i.e. once the radial step has collapsed), the first axially-extending portion of the cylindrical main body puckers in a more drastic manner, resulting in a significant reduction of the overall length of the tank seal. This is due to the fact that once the radial step has collapsed to the point where it makes contact with the annular rib, the compressive forces exerted on the seal are borne almost exclusively by the first axially-extending portion of the cylindrical main body.

The circular membrane or web of the tank seal of the present disclosure may include at least one annular groove to facilitate removal of at least one circular portion of the web. While each of the at least one grooves is provided so that the tank seal can accommodate a standard-diameter pipe, unlike existing tank seals in which the grooves are of substantially the same diameter as the diameter of the pipe to be received, each of the annular grooves in the circular membrane or web of the tank seal of the present disclosure has a diameter less than the outside diameter of the pipe to be received. It is recognized that conventional tank seals have outermost grooves approximately 4.3" in diameter to accommodate Schedule 40 pipe having an outside diameter of 4.5", but the tank seal of the present disclosure can accommodate Schedule 40 pipe by removing the circular membrane at an outermost groove of the tank seal that is less than 4.0" in diameter.

A region of the web immediately surrounding each of the annular grooves has an increased thickness compared to the rest of the web. For example, the web may have a nominal thickness in a range of about 0.025" to about 0.035", and preferably of about 0.030", over most of its surface, but may have an increased thickness of about 0.045" surrounding each of the annular grooves, i.e. a total thickness in those thickened regions of about 0.075". These thickened regions are radiused on their sides but flat, rather than radiused, in a plane parallel to the web, and project from the face of the web in a direction toward the mandrel (i.e. in a direction toward an exterior of the wall of the concrete component into which the tank seal is cast).

After a circular portion of the web is removed by cutting or tearing along one of the annular grooves, and a pipe is inserted in the resulting opening, the remaining portion of the web stretches and bugles out to accommodate the pipe, with the flat surface of the thickened region surrounding the pipe contributing to the formation of a tight seal around the pipe.

DETAILED DESCRIPTION OF THE PREFERRED EMBODIMENTS

Figure 1:
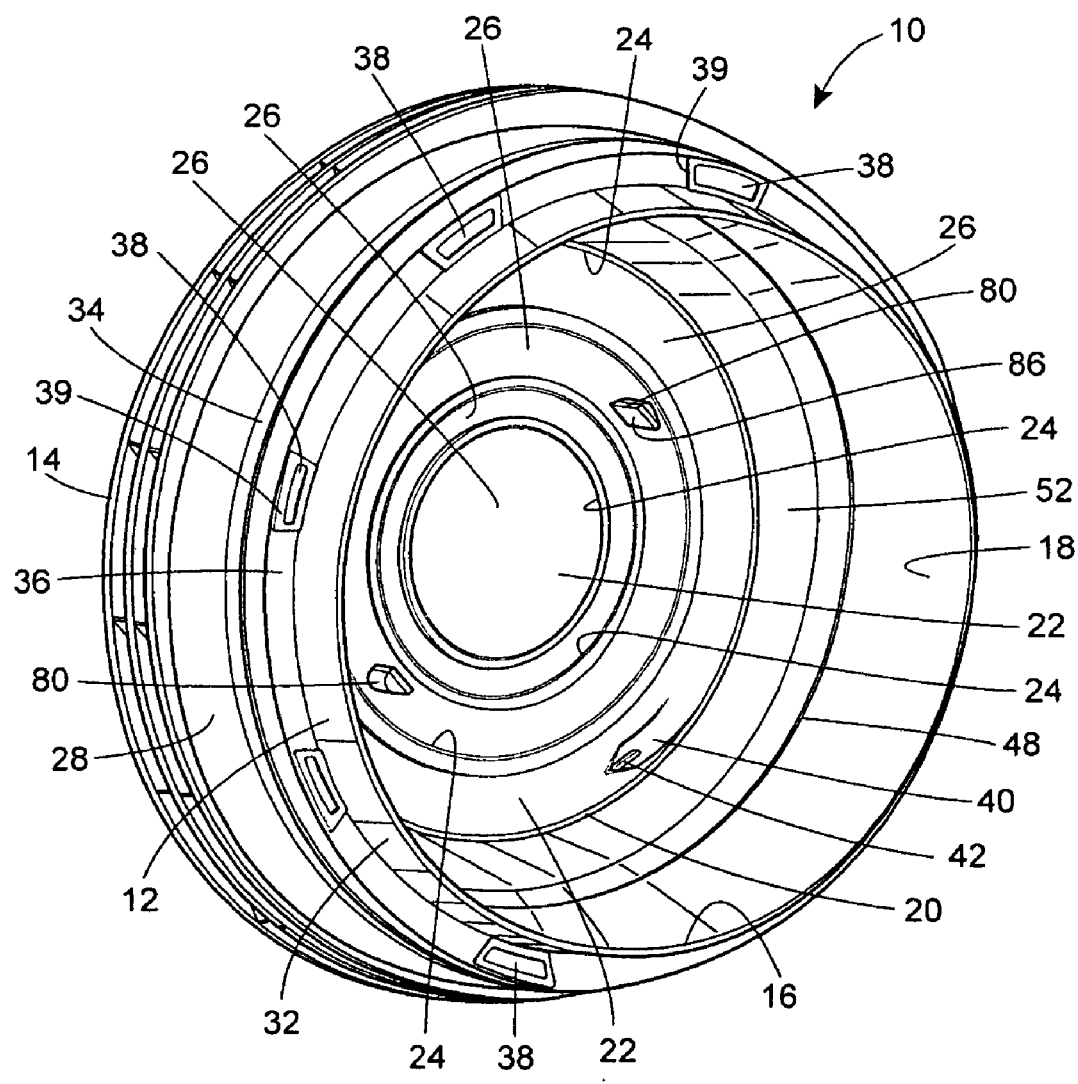
FIG. 1 is a perspective view of a tank seal of the present disclosure.
Figure 2:
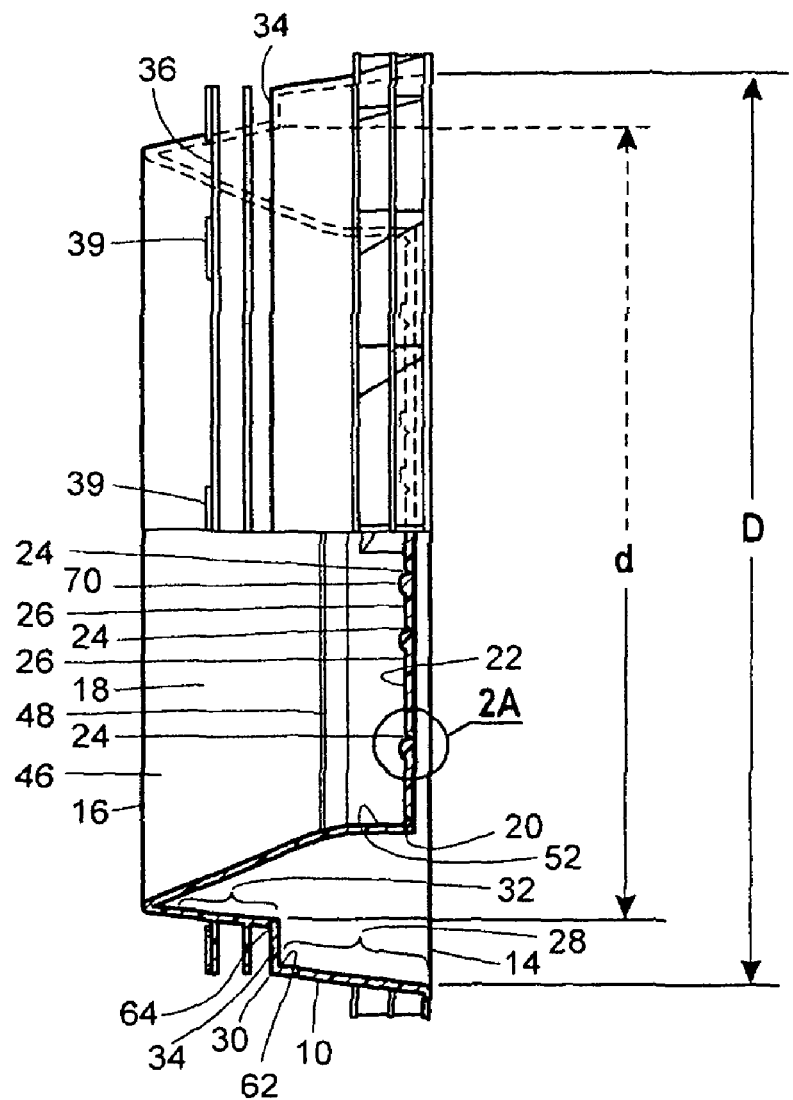
FIG. 2 is a side view of the tank seal shown in FIG. 1, shown partially in cross-section.

With reference to FIGS. 1 and 2, the tank seal 10 of the present disclosure includes a generally cylindrical main body 12 having a first open or free end 14, and a second end 16 (the second end 16 defining a mouth of the seal), and a wiper blade portion 18 extending radially inwardly of the generally cylindrical main body 12. The wiper blade portion 18 extends from the second end of the generally cylindrical main body 12 in the direction toward the first open end 14, terminating at a third end 20. A circular membrane or web 22 extends across the third end 20. The web 22 includes at least one annular groove 24 to facilitate removal of at least one circular portion 26 of the web 22.

The generally cylindrical main body 12 is stepped, such that it has a first axially-extending cylindrical portion 28 of a first outer diameter D extending from the first open end 14 to an axial position 30 intermediate the first open end 14 and the second end 16, and a second axially-extending cylindrical portion 32 extending from the axial position 30 to the second end 16. The second axially-extending cylindrical portion 32 has a second outer diameter d that is smaller than the first outer diameter D of the first axially-extending cylindrical portion 28. The first axially-extending cylindrical portion 28 preferably has a thickness in a range of about 0.03" to about 0.045", and more preferably about 0.04". The second axially-extending cylindrical portion 32 also preferably has a thickness in a range of about 0.03" to about 0.045", and more preferably about 0.04".

A radial ledge or step 34, preferably having a radial length of 0.250", separates the first cylindrical portion 28 from the second cylindrical portion 32. The radial ledge 34 is un-reinforced, and thus is generally flexible (i.e. collapsible) and has a thickness in a range of about 0.03"to about 0.05".

The second cylindrical portion 32 has one or more annular flanges or ribs 36 projecting radially outward, disposed between the axial position 30 and the second end 16. Each of the at least one annular ribs 36 preferably has a radial length of about 0.25" and a thickness of between about 0.03" and about 0.05", and more preferably between about 0.035" and about 0.045". At least one of the annular ribs 36 provided on the second axially-extending cylindrical portion 32 may include a plurality of holes or elongate, arcuate apertures 38 therein. These apertures 38 allow concrete to flow into them, thereby aiding in securement of the tank seal 10.

Preferably, the annular rib 36 closest to the second end 16 (i.e., closest to the mouth of the seal) has such apertures 38. Regions of the annular rib 36 immediately surrounding each of the elongate, arcuate apertures 38 may be bounded by frame portions 39 of the annular rib 36, such frame portions 39 being thicker than remaining regions of the annular rib 36, to provide reinforcement where desired. The frame portions 39 preferably have a thickness of about 0.08". Alternatively, the entire annular rib 36 may have a thickness of about 0.08". The annular rib 36 on the second axially-extending cylindrical portion 32 closest to the axial position 30 is spaced at least about 0.15" from the axial position 30.

At least one of the annular grooves 24 includes a tear-out initiation key or tongue 40, which comprises a grooved region that diverges from the corresponding annular groove 24. A pull tab 42, in the form of an integral projection outside the plane of the web 22, preferably extending toward the mouth or second end 16 (so as to be accessible from an exterior of a concrete box into which the seal is cast), and bounded by the tongue 40, provides a convenient grippable element so that one may use a pair of pliers or similar tool to initiate tearing the tongue 40. Such a tear easily propagates along the corresponding annular groove 24, thereby facilitating removal of the circular portion 26 of the web bounded by that annular groove 24.

Figure 3:
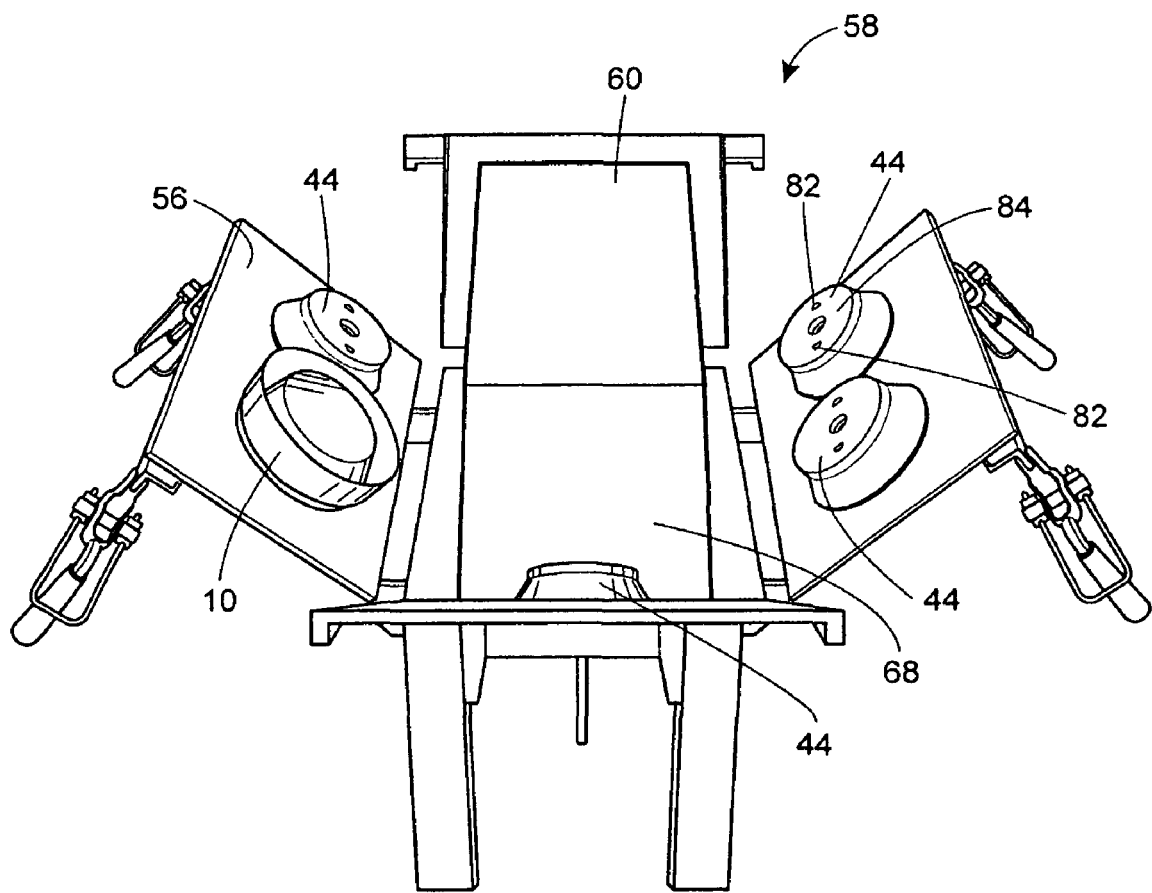
FIG. 3 is a perspective view of a form for casting a concrete box, with a plurality of mandrels secured to each hinged door of the form and a tapered core, and showing a tank seal of the present disclosure received on one of the mandrels.

The annular grooves 24 may be arranged concentrically, so as to simplify positioning of the tank seal 10 on a mandrel 44 (see FIG. 3). Existing tank seals that feature asymmetrically-arranged annular grooves (i.e., weakened annular removable portions that are axially off-set from one another, but the axes of which are radially aligned with one another, and with their grooves approaching tangency to one another) are problematic, because such tank seals are susceptible to improper positioning on a mandrel. For example, if such a conventional tank seal were placed on a mandrel 44 in the door 56 of a form 58 with the asymmetrically-arranged annular grooves arranged right-side up, and a concrete box is formed with the tank seal in that orientation, when the concrete box is removed from the form 58 and turned right side-up, the removable tear-out sections provided by the annular grooves will be 180° out of their intended position. As a result, pipes cannot be inserted into the seal at their intended heights.

Figure 8:
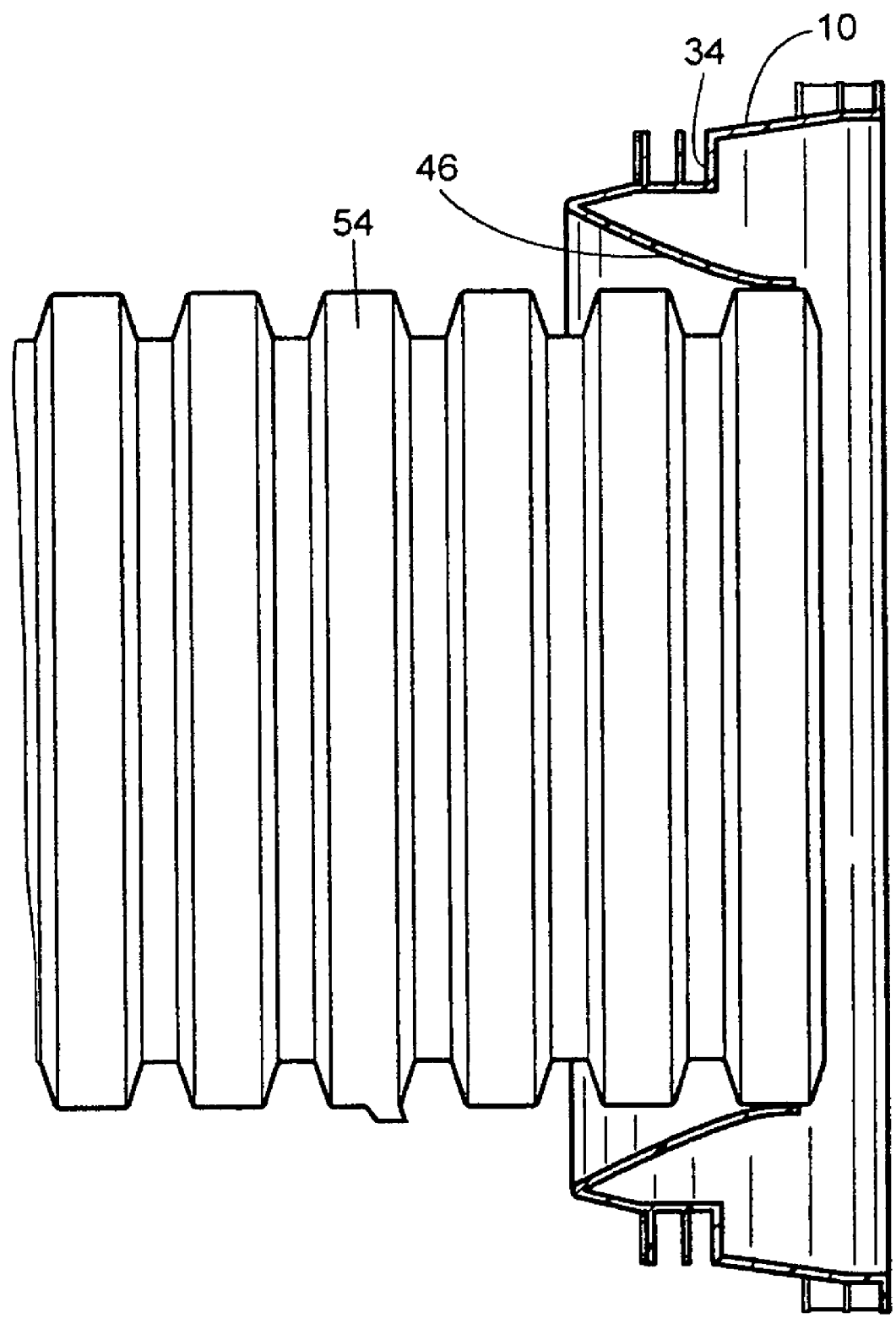
FIG. 8 is a cross-sectional view of the tank seal shown in FIGS. 1 and 2, with the entire circular sealing membrane and adjacent portion of the wiper blade portion removed along an annular groove provided in the wiper blade portion, and showing the tank seal in sealing engagement with a segment of corrugated pipe received in the resulting aperture in the wiper blade portion.

The wiper blade portion 18 of the tank seal 10 of the present disclosure includes a frustoconical segment 46. A reduced-thickness ring 48 extends the circumference of the frustoconical segment 46, intermediate a front end of the frustoconical segment (i.e., the end of the frustoconical segment 46 coinciding with the second end 16 of the generally cylindrical main body 12) and an opposite end 50 of the frustoconical segment 46. A generally cylindrical, though sloped (to accommodate removal of the tank seal 10 from a mold) segment 52 extends between the opposite end 50 of the frustoconical segment 46 and a third end of the main body 12, i.e. at an outer perimeter of the circular membrane or web 22. The reduced-thickness ring 48 facilitates cutting away the remainder of the frustoconical segment 46, the generally cylindrical segment 52, and the web 22, as may be desired to accommodate a corrugated pipe 54, as shown in FIG. 8.

Figure 4:
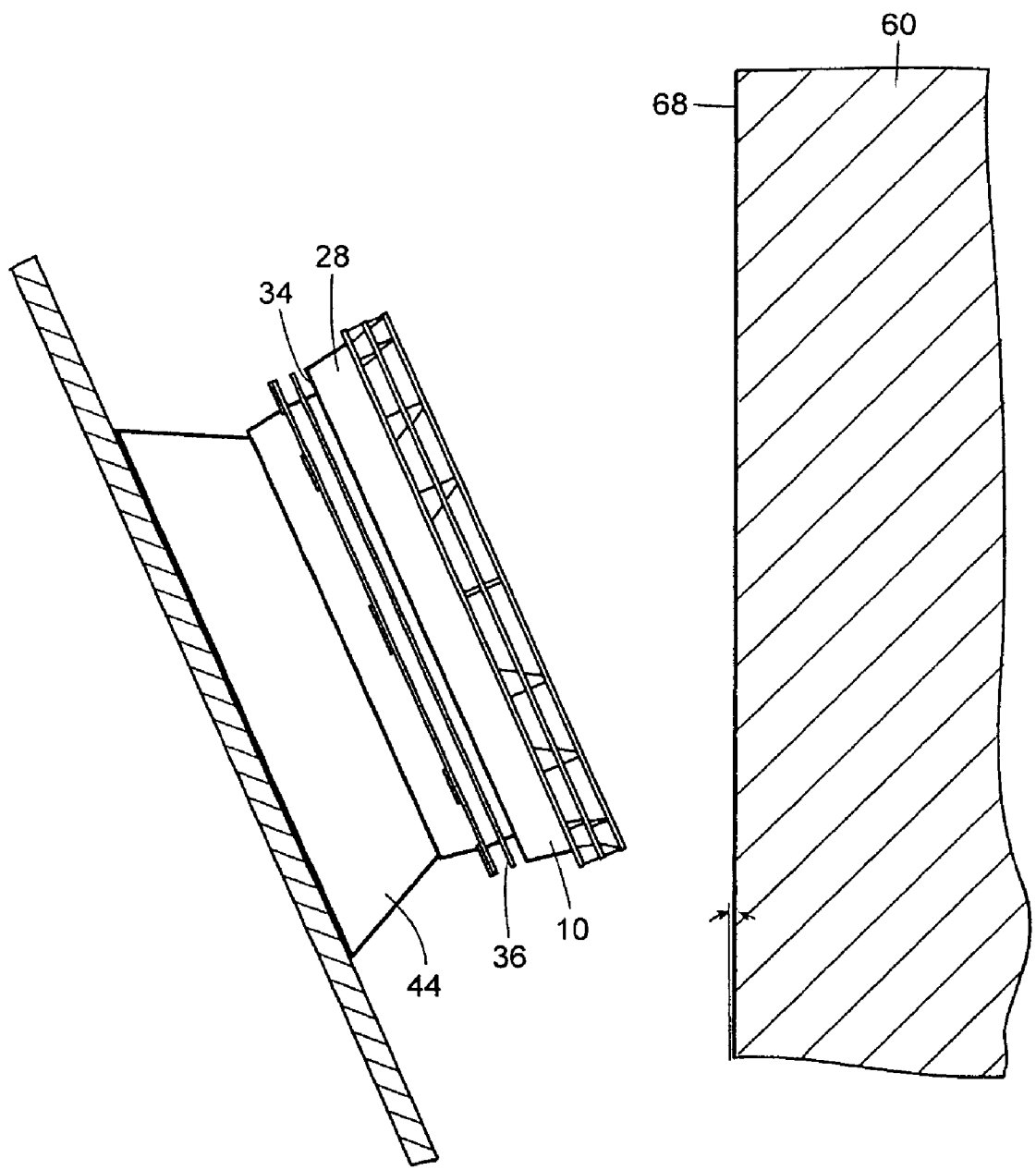
FIG. 4 is a cross-sectional view of one of the hinged doors and a portion of the tapered core shown in FIG. 3, prior to closing the door, and showing a tank seal of the present disclosure received on a mandrel secured to the door.
Figure 5:
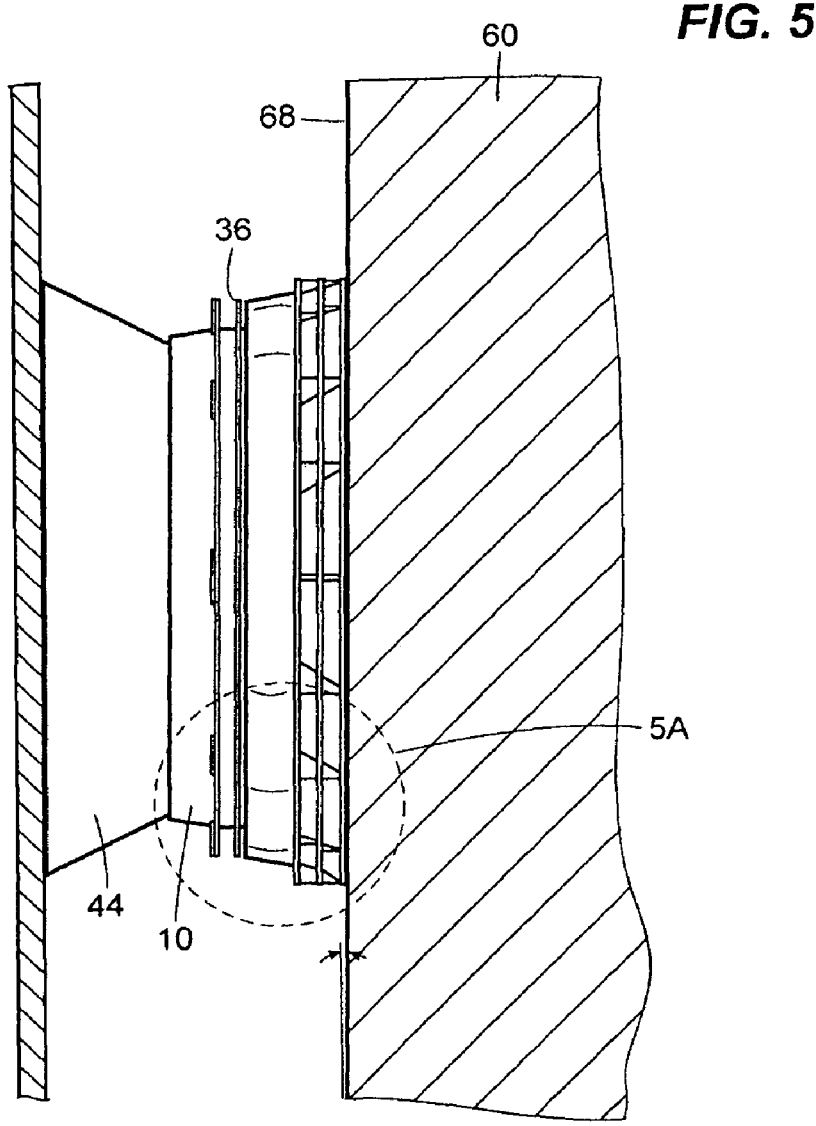
FIG. 5 is a cross-sectional view similar to FIG. 4, with the door almost in a closed position, and showing initial compression of the tank seal.
Figure 5A:
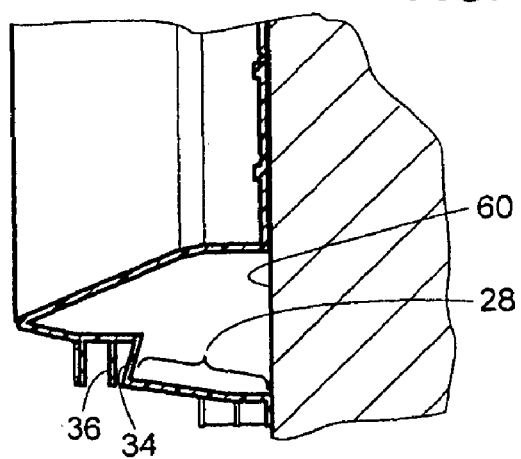
FIG. 5A is a partial cross-sectional view of the region of the tank seal bounded by the circle 5A in FIG. 5.

Turning to FIGS. 3-6, the tank seal 10 is adapted to telescopically compress, in an axial direction, so as to accommodate distances between the door 56 of a form 58 and the wall of a core 60 of the form that are shorter than the combined nominal axial length of the tank seal 10 and mandrel 44 when the tank seal 10 is mounted on the mandrel 44. The first stage of the axial compression of the tank seal 10 is best shown in FIGS. 5 and 5A. In response to compressive forces exerted on the first open end 14 and the second end 16 of the generally cylindrical main body 12 (such as when the tank seal 10 is urged against a sidewall 68 of the core 60 of a form 58 and the hinged door 56 of the form 58 is closed), the radial ledge 34 flexibly folds along its outer edge 62 (i.e., its joint with the first axially-extending cylindrical portion 28) and along its inner edge 64 (i.e., its joint with the second axially-extending portion 30). As a result of the radial ledge's 34 ability to fold along its outer edge 62 and its inner edge 64 in response to compressive forces, when the first open end 14 of the generally cylindrical main body 12 of the tank seal 10 is in contact with the wall of the core 60, the second axially-extending portion 32 moves closer to the first open end 14 as the hinged door 56 of the form 58 is closed. One of the annular flanges or ribs 36 on the second axially-extending cylindrical portion 32 is preferably spaced from the inner edge 64 of the radial ledge 34 about 0.15". The first stage of the axial compression of the tank seal 10 can preferably continue until that closest annular rib 36 makes contact with the outer portion 62 of the radial ledge 34, substantially preventing further collapse of the radial ledge.

Figure 6:
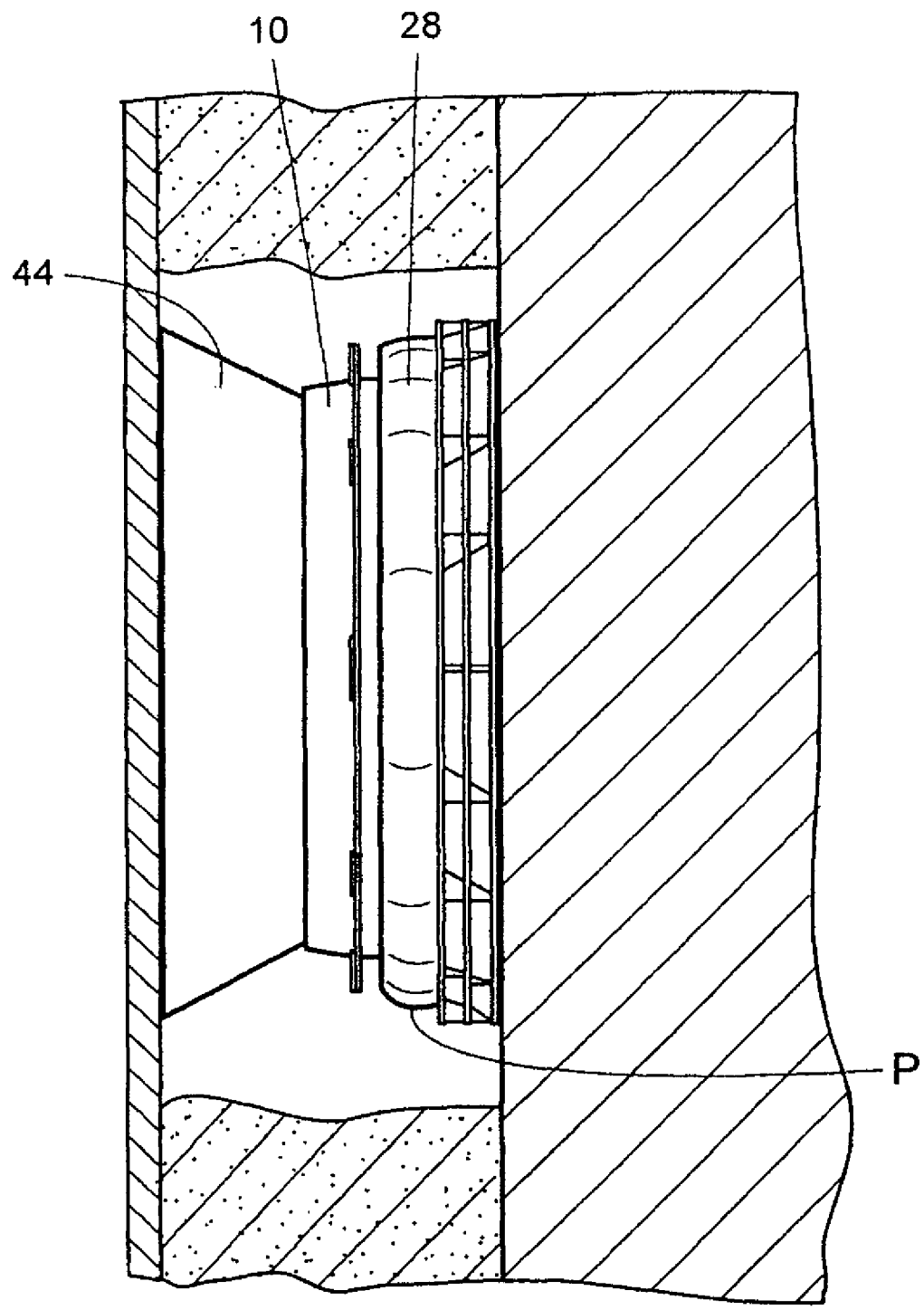
FIG. 6 is a cross-sectional view similar to FIG. 5, with the door in a fully-closed position, with concrete poured between the door and the core also shown in cross-section but partially omitted to show the tank seal under further compression.

In a second stage of the axial compression of the tank seal 10, as best shown in FIG. 6, the first axially-extending portion 28 puckers, e.g. bulges radially outwardly. The resulting compression of the tank seal 10 need not be uniform from top to bottom (as the tank seal 10 sits in the form 58) of the tank seal 10. This enables the tank seal 10 to maintain axial overall alignment in response to uneven compressive forces.

As shown in FIGS. 3-5, the side walls 68 of the core 60 are tapered from top to bottom to facilitate removal of a resulting concrete component (which is cast upside down) from the form 58. The distance between the hinged door 56 and the core 60 is less at the lower end of the tank seal 10 (during casting) than at the upper end of the tank seal 10. When the door 56 to the form 58 is closed, the compressive forces are therefore typically greater at the lower end of the tank seal 10 than at the upper end.

The first stage of the axial compression of the tank seal may occur before the second stage, but the second stage of the axial compression may commence at any time during application of compressive force on the tank seal in an axial direction. The first axially-extending portion 28 of the generally cylindrical main body 12 may therefore pucker, at least to some extent, during the first stage. Once the annular rib 36 on the second axially extending portion 32 of the cylindrical body closest to the radial ledge 34 makes contact with the outer portion 66 of the radial ledge 34, the first axially-extending portion 28 of the generally cylindrical main body 12 puckers in a manner that results in additional compression, i.e. reduction of the overall axial length of the tank seal 10. Once the radial ledge 34 has collapsed, the compressive forces exerted on the tank seal 10 are borne almost exclusively by the first axially-extending portion 28 of the cylindrical main body 10.

The integral two-stage axial compression of the tank seal 10 of the present disclosure avoids the undesirable consequences of unpredictable buckling that occurs when conventional tank seals are subjected to compressive forces. In a preferred embodiment, the first stage of axial compression allows about 0.15" of compression, and the second stage of axial compression allows additional compression of about 0.1", for a total available compression of about 0.25".

Figure 2A:
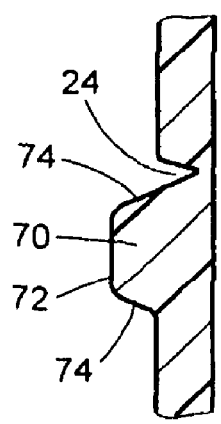
FIG. 2A is an enlarged front view, cut away, of the region bounded by the circle 2A in FIG. 2.
Figure 7:
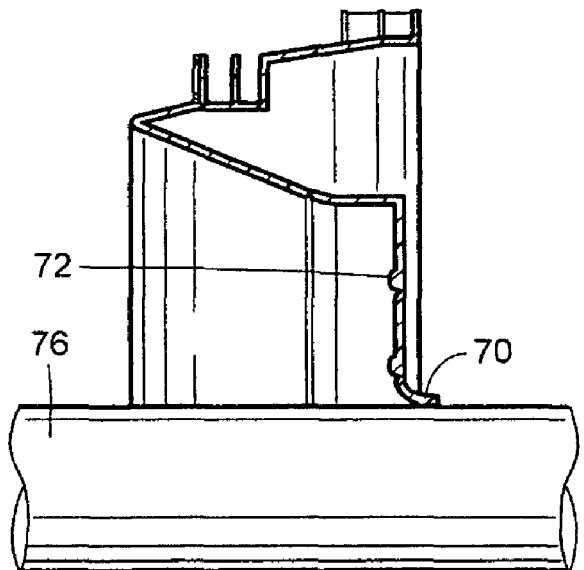
FIG. 7 is a cross-sectional view of the tank seal shown in FIGS. 1 and 2, with a circular portion of the web bounded by an innermost annular groove removed, and showing the tank seal in sealing engagement with a pipe received in the resulting aperture in the web.
Figure 7:
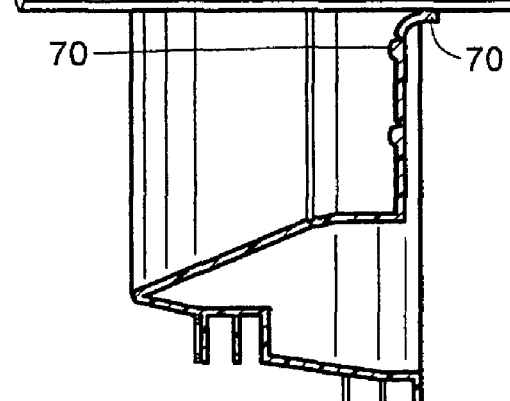
Figure 7A:
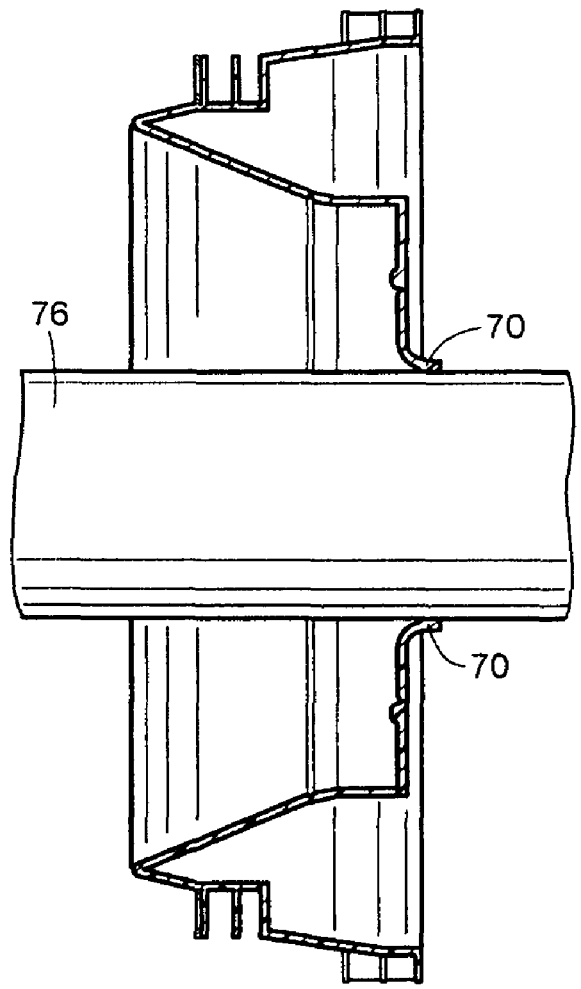
FIG. 7A is a cross-sectional view of the tank seal similar to FIG. 7, with a larger circular portion of the web bounded by an intermediate annular groove removed, and showing the tank seal in sealing engagement with a larger-diameter pipe than the pipe shown in FIG. 7 received in the resulting aperture in the web.

As best shown in FIGS. 2 and 2A, the circular membrane or web 22 includes an annular thickened region 70 surrounding each annular groove 24. These thickened regions 70 preferably have a flat surface 72 parallel to the web, and are radiused on their sides 74. Turning now to FIGS. 7 and 7A, upon removal of a circular portion 26 of the web 22 and insertion of a pipe 76 in the resulting opening, the remaining portion of the web 22 stretches and bugles out to accommodate the pipe 76. The flat surface 72 of the thickened region 70 surrounding the pipe 76 contributing to the formation of a tight seal around the pipe 76. The nominal thickness of the web 22 is preferably in a range of about 0.025" to about 0.035", and preferably of about 0.030", over most of its surface, but at the thickened regions 70, the web 22 has a thickness of about 0.075" surrounding each of the annular grooves.

In a particularly preferred embodiment, the tank seal 10 has grooves 24 sized to accommodate pipes having nominal pipe sizes of 1.5", 2", 3", and 4". Because each of the annular grooves 24 in the circular membrane or web 22 of the tank seal 10 has a diameter less than the outer diameter of the pipe 76 to be received, acceptable diameters for the respective grooves 24 intended to accommodate pipes of these various nominal pipe sizes are provided in the following table:

| Nominal Pipe Size | Inner Diameter | Outer Diameter (OD) | Diameter of Groove ($D_g$) | Stretch (OD – $D_g$) |
|---|---|---|---|---|
| 1.5" | 1.6" | 1.9" | 1.5" | 0.4" |
| 2" | 2.05" | 2.375" | 2.075" | 0.3" |
| 3" | 3.05" | 3.5" | 3.03" | 0.47" |
| 4" (SDR 35) | 3.975" | 4.2" | 3.95" | 0.25" |
| 4" (Schedule 40) | 4.0" | 4.5" | 3.95" | 0.55" |
| 4" (ASTM 2729) | 4.05" | 4.2" | 3.95" | 0.25" |

As indicated by the above table, the grooves 24 range from 0.25" to 0.55" smaller than the outer diameter of the respective pipe to be sealed therein. It will be understood that the thickness of pipes, and thus the outer diameter, of any given nominal pipe size may vary among pipe manufacturer, so the above table is provided by way of example only.

The circular membrane or web 22 also preferably includes two generally D-shaped, axial projections 80 (see FIG. 1). These generally D-shaped axial projections 80 are tapered to facilitate their removal from the injection molding cavity used in the manufacture of the tank seal 10. Each of the generally D-shaped axial projections 80 is received in a complementary generally D-shaped aperture 82 in a face 84 of the mandrel 44. The flat surfaces 86 of the generally D-shaped axial projections 80 preferably face one another, and the generally D-shaped axial projections 80 secure the tank seal 10 to the mandrel 44 without the need for any radial projections or overhangs that could interfere with removal of the mandrel 44 from the tank seal 10 after the completion of the casting process.

The tank seal 10 is preferably injection molded from linear low density polyethylene. One particularly preferred linear low density polyethylene material used for injection molding of the tank seal 10 is sold by Dow Chemical Company, as its product "DOWLEX 2517."

While various embodiments have been described above, this disclosure is not intended to be limited thereto. Variations can be made to the disclosed embodiments that are still within the scope of the appended claims.

I claim:

1. A tank seal comprising:
   a generally cylindrical main body having a first open end and a second end, and the generally cylindrical main body having a first axially-extending portion extending from the first open end to an axial position intermediate the first and second ends, the first axially-extending portion having a first outermost diameter, a second axially-extending portion of a second outermost diameter which is less than the first outer diameter, extending from the axial position intermediate the first and second ends to the second end, and a radial ledge connecting the first and second axially-extending portions at the axial position intermediate the first and second ends;
   a wiper blade portion extending radially inwardly of the first and second axially-extending portions, from the second end of the generally cylindrical main body in a direction toward the first open end, terminating at a third end;
   an annular rib projecting radially outward from the second axially-extending portion, the annular rib being axially spaced between the axial position and the second end; and
   a web extending across the third end of the generally cylindrical main body, the web including at least one annular groove therein to facilitate removal of at least one circular portion of the web.

2. The tank seal of claim 1, wherein the radial ledge connecting the first and second axially-extending portions collapses in response application of compressive force on the tank seal in an axial direction so as to reduce an axial length of the tank seal until a an outer edge of the radial ledge contacts the annular rib.

3. The tank seal of claim 2, wherein the annular rib includes a plurality of apertures therein.

4. The tank seal of claim 3, wherein each of the apertures is an elongate, arcuate aperture.

5. The tank seal of claim 3, wherein each of the apertures in the annular rib is surrounded by a frame having a thickness greater than a thickness of a remainder of the annular rib.

6. The tank seal of claim 1 wherein the annular rib has a thickness between about 0.03"and about 0.05".

7. The tank seal of claim 1, wherein the first axially-extending portion puckers in response to application of compressive force on the tank seal in an axial direction so as to reduce an axial length of the tank seal.

8. The tank seal of claim 1, wherein the radial ledge connecting the first and second axially-extending portions collapses and the first axially-extending portion puckers in response to application of compressive force on the tank seal in an axial direction so as to reduce an axial length of the tank seal.

9. The tank seal of claim 1, wherein the web includes a plurality of concentric annular grooves therein to facilitate removal of at least one circular portion of the web.

10. The tank seal of claim 1, wherein the web defines a plane and includes a tongue including a grooved region that diverges from one of the at least one annular grooves, the tongue including a pull tab projecting outside the plane of the web in a direction toward the second end of the tank seal.

11. The tank seal of claim 1, wherein the wiper blade portion includes a reduced-thickness ring extending a circumference thereof intermediate the second and third ends.

12. The tank seal of claim 1, wherein the wiper blade portion includes a frustoconical segment extending from a first frustoconical segment end coincident with the second end of the generally cylindrical main body to a second frustoconical segment end coincident with an axial position intermediate the second and third ends, and a generally cylindrical segment extending between the third and the second frustoconical segment end.

13. A method for casting a concrete wall having a tank seal therein comprising:

securing a mandrel to a door of a form;

placing a tank seal on the mandrel, the tank seal including a generally cylindrical main body having a first open end and a second end, the generally cylindrical main body having a first axially-extending portion extending from the first open end to an axial position intermediate the first and second ends, the first axially-extending portion having a first outermost diameter, a second axially-extending portion of a second outermost diameter which is less than the first outer diameter, extending from the axial position intermediate the first and second ends to the second end, and a radial ledge connecting the first and second axially-extending portions at the axial position intermediate the first and second ends;

a wiper blade portion extending radially inwardly of the first and second axially-extending portions, from the second end of the generally cylindrical main body in a direction toward the first open end, terminating at a third end;

an annular rib projecting radially outward from the second axially-extending portion, the annular rib being axially spaced between the axial position and the second end; and a web extending across the third end of the generally cylindrical main body, the web including at least one annular groove therein to facilitate removal of at least one circular portion of the web;

advancing the door of the form toward a wall of a core in the form until the tank seal makes contact with the wall of the core;

continuing to advance the door of the form toward the wall of the core, thereby exerting compressive force on the tank seal in an axial direction, whereby the radial ledge connecting the first and second axially-extending portions collapses so as to reduce an axial length of the tank seal; and pouring concrete between the door and the wall of the core.

14. The method of claim 13 further comprising, before pouring concrete between the door and the wall of the core, continuing to advance the door of the form toward the wall of the core, until an outer edge of the radial ledge contacts the annular rib, and then further advancing the door of the form toward the wall of the core, thereby exerting compressive force on the tank seal in the axial direction, causing the first axially-extending portion of the tank seal to pucker so as to further reduce the axial length of the tank seal.

\* \* \* \* \*

UNITED STATES PATENT AND TRADEMARK OFFICE
CERTIFICATE OF CORRECTION

| | | |
|---|---|---|
| PATENT NO. | : 8,079,599 B2 | Page 1 of 1 |
| APPLICATION NO. | : 12/334011 | |
| DATED | : December 20, 2011 | |
| INVENTOR(S) | : Theodore W. Meyers | |

It is certified that error appears in the above-identified patent and that said Letters Patent is hereby corrected as shown below:

On the Title Page, item: (73) Assignee

Delete "Tug-Tite, Inc." and replace with --Tuf-Tite, Inc.--.

Signed and Sealed this
Twenty-fourth Day of January, 2012

David J. Kappos
*Director of the United States Patent and Trademark Office*